US011636152B2

(12) United States Patent
Kogan et al.

(10) Patent No.: US 11,636,152 B2
(45) Date of Patent: Apr. 25, 2023

(54) SCALABLE RANGE LOCKS

(71) Applicant: Oracle International Corporation, Redwood City, CA (US)

(72) Inventors: Alex Kogan, Burlington, MA (US); David Dice, Burlington, MA (US); Shady Alaaeldin Mohamed Abdelkader Rabie Issa, Lisbon (PT)

(73) Assignee: Oracle International Corporation, Redwood City, CA (US)

( * ) Notice: Subject to any disclaimer, the term of this patent is extended or adjusted under 35 U.S.C. 154(b) by 621 days.

(21) Appl. No.: 16/407,007

(22) Filed: May 8, 2019

(65) Prior Publication Data

US 2020/0265091 A1  Aug. 20, 2020

Related U.S. Application Data

(60) Provisional application No. 62/806,593, filed on Feb. 15, 2019.

(51) Int. Cl.
*G06F 16/901* (2019.01)
*G06F 11/30* (2006.01)
*G06F 16/176* (2019.01)

(52) U.S. Cl.
CPC ...... *G06F 16/9024* (2019.01); *G06F 11/3006* (2013.01); *G06F 16/1774* (2019.01)

(58) Field of Classification Search
CPC ............. G06F 16/9024; G06F 16/1774; G06F 16/3006
USPC .......................................................... 707/731
See application file for complete search history.

(56) References Cited

U.S. PATENT DOCUMENTS 9,378,052 B1 *  6/2016  Dou ........................ G06F 9/526
9,875,270 B1 *  1/2018  Muniswamy Reddy ....................
                                                           G06F 16/23
2010/0076940 A1 *  3/2010  Bordawekar ....... G06F 16/9027
                                                                  707/704

(Continued)

OTHER PUBLICATIONS

Davidlohr Bueso. Locking: Introduce range reader/writer lock. https://lwn.net/Articles/722741/, May 15, 2017. Accessed: Oct. 29, 2018.

(Continued)

*Primary Examiner* — Hosain Talam
*Assistant Examiner* — Nicholas E Allen
(74) *Attorney, Agent, or Firm* — Robert C. Kowert; Kowert, Hood, Munyon, Rankin & Goetzel, P.C.

(57) ABSTRACT

A computer comprising one or more processors and memory may implement multiple threads performing mutually exclusive lock acquisition operations on disjoint ranges of a shared resource each using atomic compare and swap (CAS) operations. A linked list of currently locked ranges is maintained and, upon entry to a lock acquisition operation, a thread waits for all locked ranges overlapping the desired range to be released then inserts a descriptor for the desired range into the linked list using a single CAS operation. To release a locked range, a thread executes a single fetch and add (FAA) operation. The operation may be extended to support simultaneous exclusive and non-exclusive access by allowing overlapping ranges to be locked for non-exclusive access and by performing an additional validation after locking to provide conflict resolution should a conflict be detected.

20 Claims, 16 Drawing Sheets

(56) References Cited

U.S. PATENT DOCUMENTS

| | | | | |
|---|---|---|---|---|
| 2010/0211753 | A1* | 8/2010 | Ylonen | G06F 12/0253 711/165 |
| 2013/0125097 | A1* | 5/2013 | Ebcioglu | G06F 8/4452 717/136 |
| 2013/0185270 | A1* | 7/2013 | Brower | G06F 16/2343 707/704 |
| 2013/0346363 | A1* | 12/2013 | Arakawa | G06F 16/27 707/610 |
| 2015/0212934 | A1* | 7/2015 | Shanmugam | G06F 9/46 711/154 |
| 2015/0286586 | A1* | 10/2015 | Yadav | G06F 12/1466 711/152 |
| 2015/0378908 | A1* | 12/2015 | Gschwind | G06F 9/467 711/141 |
| 2016/0139966 | A1* | 5/2016 | Greco | G06F 9/4881 718/106 |
| 2016/0224373 | A1* | 8/2016 | Harris | G06F 9/5027 |
| 2016/0335117 | A1* | 11/2016 | Kogan | G06F 9/467 |
| 2017/0039094 | A1* | 2/2017 | Dice | G06F 9/526 |
| 2017/0103039 | A1* | 4/2017 | Shamis | H04L 67/1097 |
| 2017/0116255 | A1* | 4/2017 | Kim | G06F 16/2255 |
| 2017/0132133 | A1* | 5/2017 | Gschwind | G06F 12/084 |
| 2017/0344473 | A1* | 11/2017 | Gidra | G06F 12/0261 |
| 2017/0351543 | A1* | 12/2017 | Kimura | G06F 3/0659 |
| 2018/0018359 | A1* | 1/2018 | Liljedahl | G06F 16/2219 |
| 2018/0024901 | A1* | 1/2018 | Tankersley | G06F 16/2379 707/694 |
| 2018/0107514 | A1* | 4/2018 | Dice | G06F 9/5022 |
| 2020/0265091 | A1* | 8/2020 | Kogan | G06F 11/3006 |
| 2020/0293499 | A1* | 9/2020 | Kohli | G06F 3/067 |

OTHER PUBLICATIONS

Irina Calciu, Dave Dice, Tim Harris, Maurice Herlihy, Alex Kogan, Viren- dra J. Marathe, and Mark Moir. Message passing or shared memory: Evaluating the delegation abstraction for multicores. In Proceedings of International Conference Principles of Distributed Systems (OPODIS), pp. 83-97, 2013.

Austin T. Clements, M. Frans Kaashoek, and Nickolai Zeldovich. Scalable address spaces using rcu balanced trees. In Proceedings of the Seventeenth International Conference on Architectural Support for Programming Languages and Operating Systems (ASPLOS), pp. 199-210, 2012.

Jonathan Corbet. MCS locks and qspinlocks. https://lwn.net/Articles/ 590243, Mar. 11, 2014. Accessed: Oct. 29, 2018.

Jonathan Corbet. Range reader/writer locks for the kernel. https://lwn.net/Articles/724502, Jun. 5, 2017. Accessed: Sep. 28, 2018.

D. Dice and A. Kogan. BRAVO—Biased Locking for Reader-Writer Locks. ArXiv e-prints, Oct. 2018.

Laurent Dufour. Replace mmap_sem by a range lock, https://lwn.net/ Articles/723648/, May 24, 2017. Accessed: Oct. 29, 2018.

Jose M. Faleiro and Daniel J. Abadi. Latch-free synchronization in database systems: Silver bullet or fool's gold? In Proceedings of Conference on Innovative Data Systems Research (CIDR), 2017.

K. Fraser. Practical lock-freedom. PhD thesis, University of Cambridge, 2004.

Timothy L. Harris. A pragmatic implementation of non-blocking linked- lists. In Proceedings of the 15th International Conference on Distributed Computing (DISC), pp. 300-314, 2001.

Thomas E. Hart, Paul E. McKenney, Angela Demke Brown, and Jonathan Walpole. Performance of memory reclamation for lockless synchronization. J. Parallel Distrib. Comput., 67(12):1270-1285, 2007.

Jan Kara, lib: Implement range locks. https://lkml.org/lkml/2013/1/31/483, Jan. 31, 2013. Accessed: Sep. 28, 2018.

Paul E. Mckenney and Silas Boyd-wickizer. RCU usage in the linux kernel: One decade later. Technical report, 2012.

Paul E. McKenney and Jack Slingwine. Read-copy-update: Using execution history to solve concurrency problems. In Parallel and Distributed Computing and Systems, pp. 509-518, 1998.

John M. Mellor-Crummey and Michael L. Scott. Scalable reader-writer synchronization for shared-memory multiprocessors. In Proceedings of ACM SIGPLAN Symposium on Principles and Practice of Parallel Programming (PPoPP), pp. 106-113, 1991.

Maged M. Michael. Hazard pointers: Safe memory reclamation for lock-free objects. IEEE Trans. Parallel Distrib. Syst., 15(6):491-504, 2004.

Frank Schmuck and Roger Haskin. Gpfs: A shared-disk file system for large computing clusters. In Proceedings of USENIX Conference on File and Storage Technologies (FAST), 2002.

* cited by examiner

```
struct RangeDescriptor {
    Integer Start;           201
    Integer End;             202
    Boolean Exclusive;       203
    RangeDescriptor* next;   204
};
```
200

FIG. 2

SCALABLE RANGE LOCKS

This application claims benefit of priority to U.S. Provisional Patent Application No. 62/806,593 filed Feb. 15, 2019 and titled "Scalable Range Locks" which is hereby incorporated by reference in its entirety.

BACKGROUND

Field of the Disclosure

This disclosure relates generally to concurrent programming, and more particularly to systems and methods for performing lock-free atomic reservations of ranges of data elements.

Description of the Related Art

Range locks are a synchronization construct designed to provide concurrent access to multiple threads (or processes) to disjoint parts of a shared resource. Range locks are frequently used in the implementation of parallel file systems to resolve conflicts arising in which multiple parallel processes attempt to write different parts of the same file. A conventional approach of using a single file lock to mediate the access among these writing processes creates a synchronization bottleneck. Range locks allow each writer to specify a range of the file it is going to update, thus allowing serialization between writers accessing the same part of the file, but parallel access for writers otherwise.

Range locks, however, may be useful in other contexts, for example in memory management. Traditional approaches may use a semaphore protecting access to an entire virtual memory address (VMA) structure leading to significant performance bottlenecks due to contention. The use of range locks in this application may result in significant performance improvements for reasons similar to those for parallel file systems described above.

Existing range lock implementations employ a data structure describing ranges of currently locked elements and accessed by means of a controlling spin lock. To acquire a range, a thread first acquires the spin lock and then traverses the data structure to find a count of all the ranges that overlap with, and thus block, the desired range. Next, the thread inserts a node describing its range into the data structure, and releases the spin lock. The thread then waits for the count of blocking ranges to be zero which happens once other threads that have acquired blocking ranges exit their respective critical sections. The thread may then start the critical section that the lock protects.

This range lock implementation has several shortcomings. The first is the use of a spin lock to protect the access to the data structure. This spin lock can easily become a bottleneck under contention. Note that every acquisition and release of the range lock results in the acquisition and release of the spin lock. Therefore, even non-overlapping ranges and/or ranges acquired for read have to synchronize using that same spin lock. Second, placing all ranges in the data structure limits concurrency. Finally, the existing range locks have no fast path of execution, that is, even when there is only a single thread acquiring a lock on a range, it must still acquire the spin lock and update the data structure.

SUMMARY

Methods, techniques and mechanisms for providing range locks utilizing linked lists are described. These lists are easy to maintain in a lock-less fashion allowing the range locks to avoid the use of controlling locks in the common case. Multiple range lock embodiments are described, including range locks for the mutually exclusive range acquisitions and range locks that allow for both exclusive and non-exclusive acquisitions. In addition, other embodiments may include extensions for fairness and for optimization of low-contention execution.

The improvements in the various embodiments described herein are achieved by elimination of a controlling lock for accessing the data structure and a reduction in the number of ranges described in the data structure. Instead, the embodiments rely on design of the data structure enabling the use of primitive atomic update instructions provided in nearly every modern processor architecture. This enables higher levels of parallelism by allowing concurrent threads to access the data structure and to acquire ranges.

BRIEF DESCRIPTION OF THE DRAWINGS

FIG. 2 is a diagram illustrating a range descriptor data structure used in various embodiments.

Figure 1:
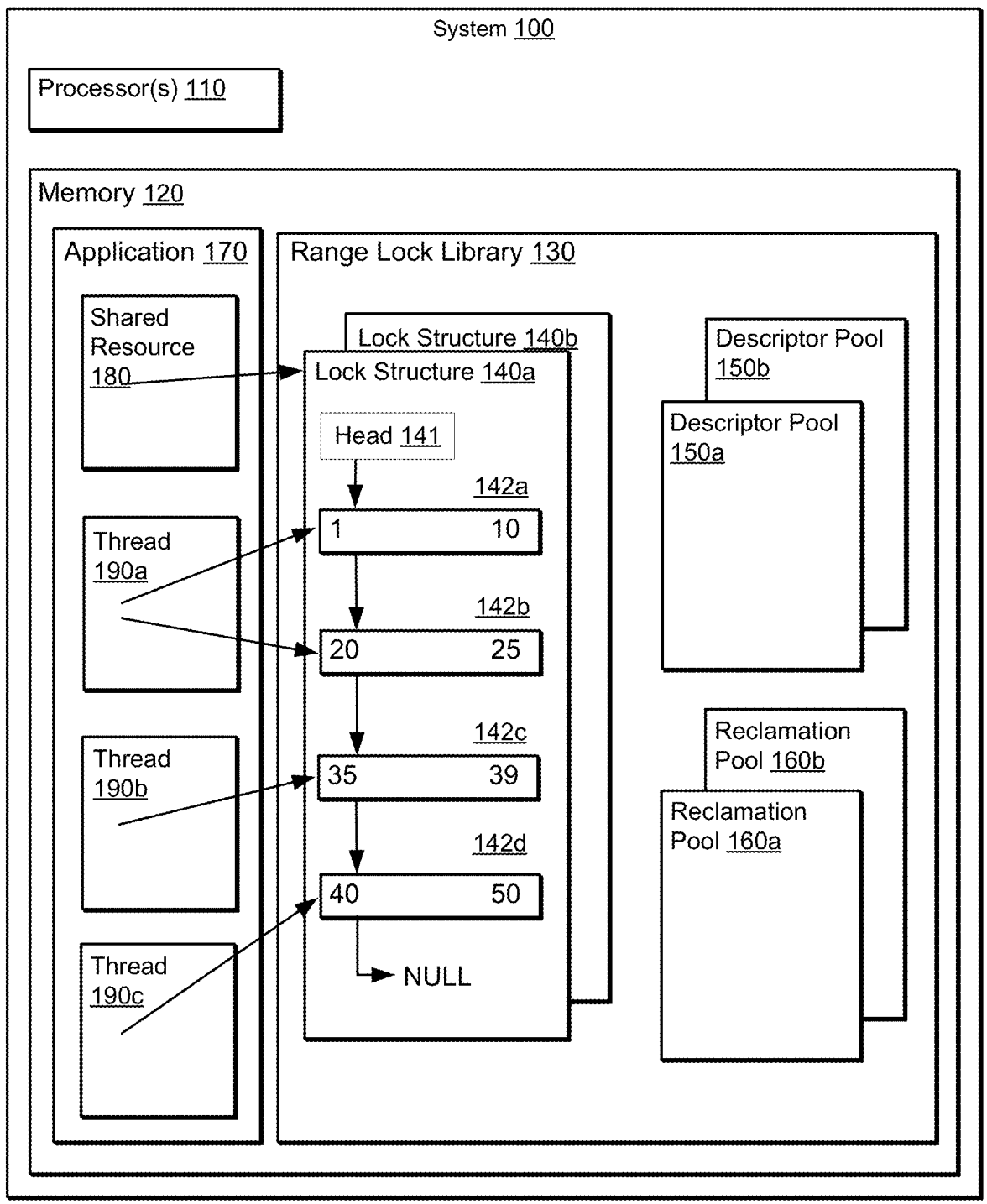
FIG. 1 is a block diagram illustrating a system implementing an application execution environment including multiple threads sharing a resource through the use of range locks.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Methods, techniques and mechanisms for providing range locks by utilizing nodes in a linked list where each node in the list represents an acquired range are described herein. Such lists are easy to maintain in a lock-less fashion allowing the range locks to avoid the use of controlling locks in the common case.

The improvements in the various embodiments described herein are achieved by elimination of a controlling lock for accessing the data structure and a reduction in the number of ranges described in the data structure. Instead, the embodiments rely on a data structure design enabling the use of primitive atomic update instructions provided in nearly every modern processor architecture. This enables higher levels of parallelism by allowing concurrent threads to access the data structure and to acquire ranges.

Among these primitive atomic update instructions is the atomic Compare-And-Swap (CAS) instruction used pervasively in concurrent algorithms in shared memory systems. The CAS instruction conditionally updates a memory word such that a new value is written if and only if the old value in that word matches an expected value. Variations of this primitive instruction are provided in nearly every modern processor architecture. In addition, various embodiments described herein may employ a variety of atomic update instructions to perform atomic read-modify-write operations on memory words, including for example an atomic Fetch-And-Add (FAA) instruction. These instructions may be used to atomically modify the contents of memory locations.

FIG. 1 is a block diagram illustrating a system implementing an application execution environment including multiple threads sharing a resource through the use of range locks. The System 100 includes one or more processors 110 capable executing multiple parallel threads of execution and a Memory 120 that includes an application execution environment comprising a Range Lock Library 130 and an Application 170. The Application 170 may include multiple executing Threads 190a-c that access a Shared Resource 180 using the Range Lock Library 130. The Range Lock Library 130 may include one or more Descriptor Pools 150a-b containing available range descriptors for use in acquiring locks of ranges of shared resources. In addition, the Range Lock Library 130 may include one or more Reclamation Pools 130a-b for use in freeing descriptors after range locks have been released. Various embodiments may implement any number of pools 150 and 160. For example, each shared resource may maintain its own set of pools and/or each thread accessing a shared resource may maintain its own set of pools.

The Range Lock Library 130 may include Lock Structures 140a-b to represent ranges currently locked by Application 170. As shown in FIG. 1, Lock Structure 140a is associated with Shared Resource 180. Each Lock Structure 140 contains a linked list of RangeDescriptor structures 200, described in detail below in FIG. 2, that are sorted in ascending order based on the starting values of each range in the list. The Lock Structure 140 contains a Head pointer 141 identifying a first RangeDescriptor 142a which defines a range currently locked by Thread 190a. The first RangeDescriptor 142a is linked to a second RangeDescriptor 142b also currently locked by Thread 190a. The second RangeDescriptor 142a is linked to third and fourth RangeDescriptors 142c and 142d currently locked by Threads 190b and Thread 190d.

While FIG. 1 shows a single application with three executing threads and one shared resource, this example is not intended to be limiting and any number of applications with any number of threads sharing any number of resources may be envisioned. Furthermore, any individual thread may, at a given time, currently lock any number of ranges. Also, while FIG. 1 describes a list of four, non-overlapping ranges, any number of ranges may be locked at a given time and overlapping locked ranges may be supported in some embodiments. Finally, while the linked list sorted in ascending order based on the starting values of each range in the list, other embodiments may sort in differing order, for example in descending order of the starting or ending values of each range or based on a hash of these values, and the sorting technique used is not intended to be limiting.

Various embodiments of range locks described herein employ linked lists of nodes where each node in the list includes a descriptor that describes an acquired range and a link to a next node descriptor in the list. FIG. 2 illustrates one embodiment of such a descriptor. The RangeDescriptor structure 200 includes a range described by a Start field 201 and an End field 202. As shown in FIG. 2, these fields contain integral values and are defined as a generic Integer type, where the size of Integer type and the number of unique values it contains may vary depending on application or execution platform. This Integer type, however, is not intended to be limiting and any specification of a range of elements may be employed. Some embodiments may optionally include a Boolean Exclusive field 203 which indicates whether lock of the range identified by the descriptor is exclusive or non-exclusive. In addition, the RangeDescriptor structure 200 includes a link to a next RangeDescriptor structure 204. A linked list of RangeDescriptor structures is formed by linking the next field 204 of each RangeDescriptor structure, with the next field of the final RangeDescriptor structure containing a zero or NULL value indicating the termination of the list. In addition, the RangeDescriptor structure contains an indicator that the descriptor is marked for deletion. As modern computer architectures provide native memory word sizes of multiple bytes, for example 4 bytes or 8 bytes, data structures implemented on these computer architectures are typically aligned on multiples of the native memory word size. As a result, some number of least significant bits of addresses to these aligned data structures, including RangeDescriptor structure, must be zero and the next field 204 may not otherwise contain useful information in the least significant bits of the field. The various embodiments of range locks described herein take advantage of this by repurposing the least significant bit of the next field 204 where a value of zero indicates that the descriptor contains and actively acquired lock and a value of one indicates that the range is inactive and has been marked for deletion. This implementation of the marked information is not intended to be limiting, however, and any otherwise unused bits of the various fields of the RangeDescriptor structure 204 may be used for this purpose, values other than zero and one, respectively, may be employed and the RangeDescriptor structure 204 may contain an additional field other than the three fields described herein to provide for the deletion information.

Figure 3:
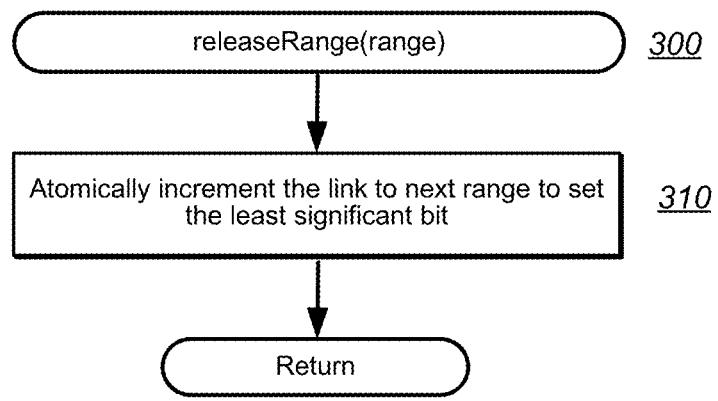
FIG. 3 is a flow diagram illustrating one embodiment of releasing an acquired range of data elements of a shared resource.

FIG. 3 is a flow diagram illustrating one embodiment of releasing an acquired range of data elements of a shared resource. The method begins at step 300 where the method is invoked with a range descriptor defining a range of elements to be released. The method then proceeds to step 310 where the next field 204 of the range descriptor is atomically incremented to set the least significant bit using, for example, an atomic Fetch-And-Add (FAA) instruction. Alternatively, other atomic instructions may be used to set the least significant bit of the next field 204 of the range descriptor to indicate that the descriptor is marked for deletion and the particular atomic instruction used is not intended to be limiting. For example, an atomic update instruction capable of setting one or more individual bits within a memory word may be used. Upon completion of the atomic instruction, the method is complete.

Acquiring Ranges for Exclusive Use

Figure 4:
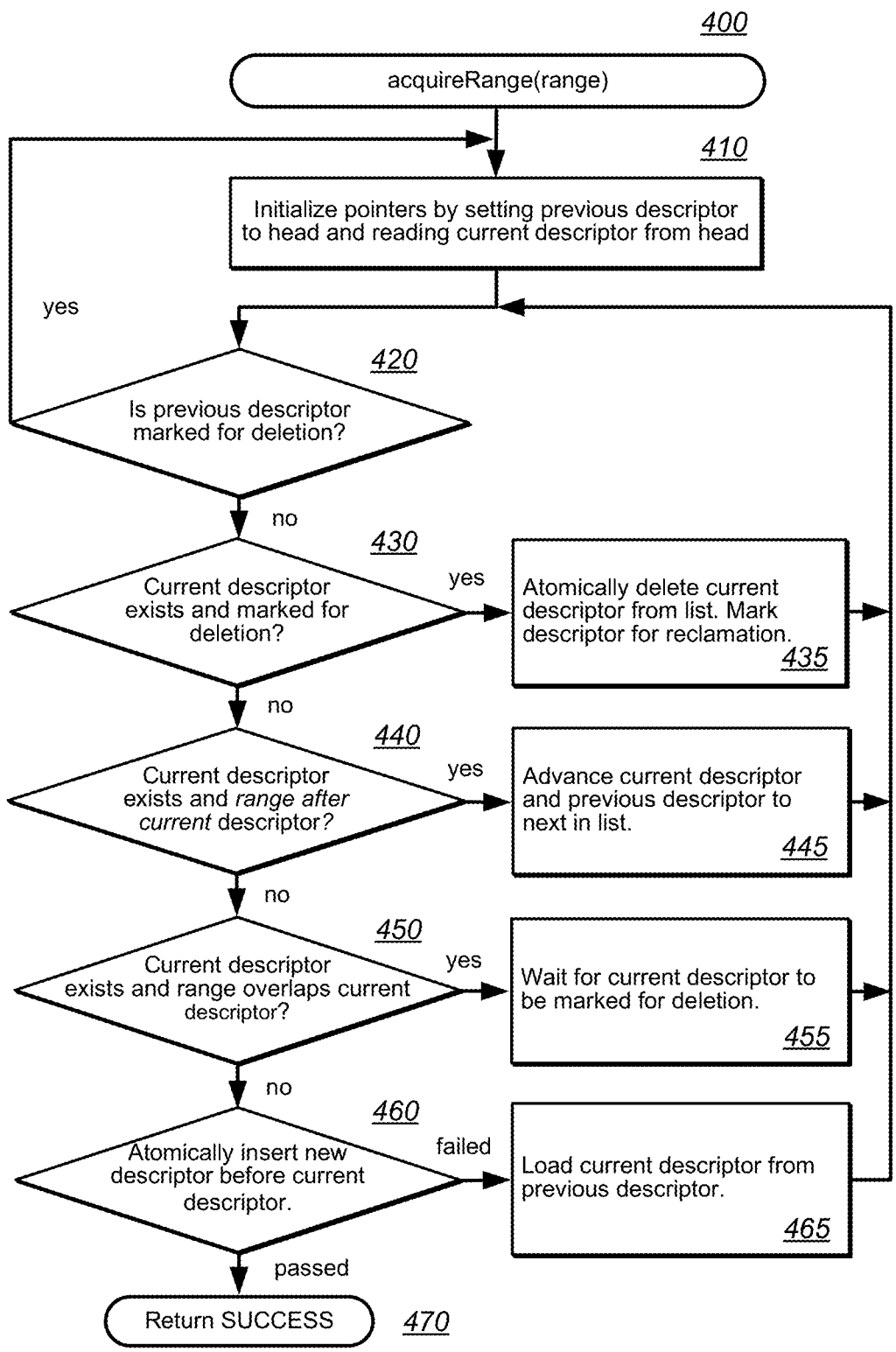
FIG. 4 is a flow diagram illustrating one embodiment of atomically acquiring a lock on a range of data elements of a shared resource for exclusive use.

FIG. 4 is a flow diagram illustrating one embodiment of atomically acquiring a lock on a range of data elements of a shared resource for exclusive use. As exclusive lock of a range of data elements precludes acquisition of any element within the range by entity, no overlapping of ranges may occur. The embodiment employs a linked list of nodes where each node in the list includes a descriptor that describes an acquired range and a link to a next node descriptor in the list. The node descriptor is further described above in FIG. 2. The list is sorted in ascending order based on the starting values of each range in the list. In addition, the list includes a controlling descriptor that includes a link to a first node descriptor, or a list head pointer, in the list. This controlling descriptor may be provided using a node descriptor structure or any number of other data structures in various alternative embodiments. Initially, the list is empty. This may be indicated by an initial value of the list head pointer value of zero or NULL which indicates that no more elements exist in the list. This indication is not intended to be limiting and any suitable means for indicating an end to the list may be employed. In order to acquire a range of elements, an executing thread must successfully insert a corresponding range descriptor into the list.

An embodiment of the method of FIG. 4 begins at step 400 where the method is invoked with a range descriptor defining a range of elements desired to be acquired for exclusive use. The method employs an identifier of the current descriptor in the list as well as a previous identifier of the link to the current descriptor contained either in a previous range descriptor or the controlling descriptor of the list.

The method proceeds to step 410 where the previous identifier is initialized with the list head pointer and the current descriptor is initialized with the first descriptor in the list, as identified by the value contained in the list head pointer. In alternative embodiments that include extensions for low contention operation such as described below in FIGS. 8A-8C, this step may be extended as described in FIG. 8B. The method continues to step 420. As discussed above in FIG. 2, the range descriptor maintains an indicator that it is marked for deletion within the link to a next node descriptor. Therefore, step 420 determines if the previous descriptor has been marked for deletion. If the previous descriptor is marked for deletion, the method restarts at step 410. Otherwise, the method proceeds to step 430.

In step 430, the method determines if the current descriptor exists and is marked for deletion. If the current descriptor is not marked for deletion or does not exist, the method proceeds to step 440. Otherwise, the method proceeds to step 435 where the current descriptor is deleted from the list by copying the next descriptor identified in the current descriptor into the previous identifier and the method returns to step 420.

In step 440, the method determines if the current descriptor exists and the desired range begins after the end of the current descriptor as defined by the Start field 201 of desired range descriptor and the End field 202 of the current descriptor. If the desired range begins after the end of the current descriptor, the method proceeds to step 445 where the identifier of the current descriptor and the previous identifier of the link to the current descriptor are advanced to the next descriptors in the list and the method returns to step 420. If the desired range does not begin after the end of the current descriptor the method proceeds to step 450.

In step 450, the method determines if the current descriptor exists and overlaps with the current descriptor. As exclusive lock of a range of data elements precludes acquisition of any element within the range by entity, no overlapping of ranges may occur. Therefore, if such an overlap is determined, the method proceeds to step 455 where the method waits for the current descriptor to be marked for deletion. The method then returns to step 420. If the desired range does not overlap with the current descriptor the method proceeds to step 460.

In step 460 the method has determined the location where the desired range descriptor is to be inserted. The method inserts the desired range descriptor before the current descriptor using an atomic Compare-And-Swap (CAS) instruction to update the value of the previous identifier. As other threads may be concurrently executing the method, multiple threads may contend for the updating of the previous identifier and the CAS instruction could fail. If the CAS instruction fails, the method proceeds to step 465 where the current descriptor is loaded from the previous identifier (which has been updated by another thread). The method then returns to step 420. If the CAS instruction passes, the desired range has been successfully added to the list, the range is acquired and the method proceeds to step 470 where successful completion is returned.

Figure 5A:
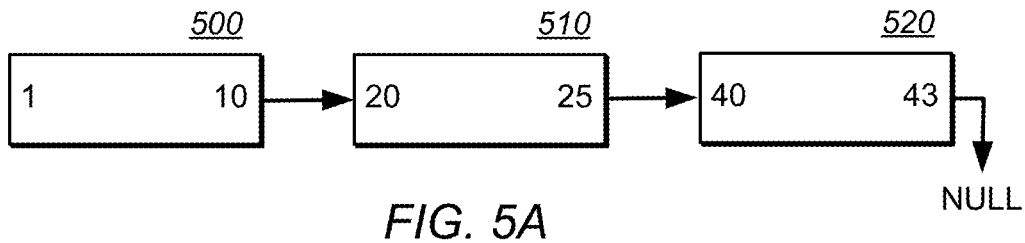
FIGS. 5A-5D are diagrams collectively illustrating a new range descriptor being added into the linked list of nodes using the embodiment of the method shown in FIG. 3.
Figure 5B:
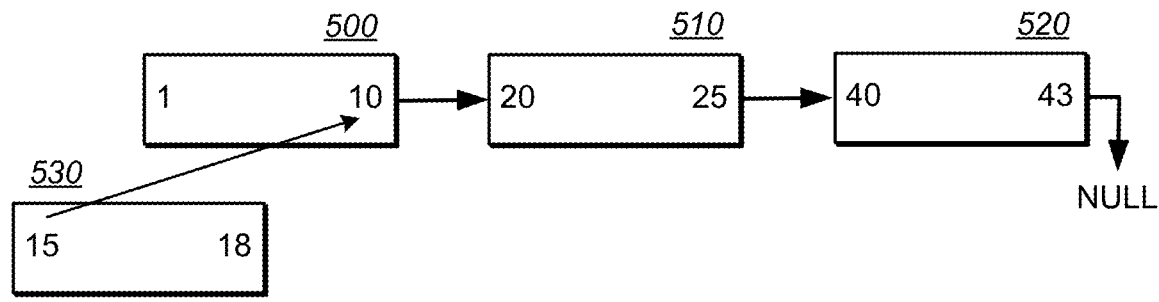
Figure 5C:
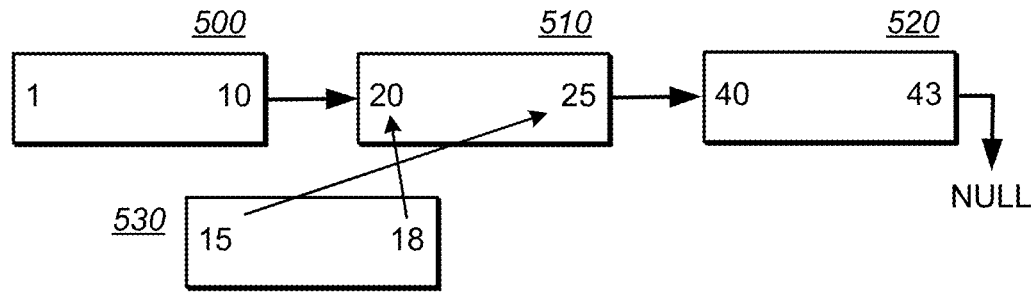

FIGS. 5A-5D are diagrams collectively illustrating a new range descriptor being added into the linked list of nodes using the embodiment of the method shown in FIG. 4. FIG. 5A illustrates the initial state of the linked list of nodes prior to the acquisition of the additional range. Three ranges are currently acquired and are represented in the linked list of nodes sorted in ascending order based on the starting values of each range in the list. The first range 500 has acquired elements 1-10 of the shared resource and is linked to the second range 510. The second range 510 has acquired elements 20-25 of the shared resource and is linked to the third range 520. The third range 520 has acquired elements 40-43 of the shared resource and contains a NULL value in its next field 204, indicating the end of the linked list.

FIG. 4B illustrates a new range 530 to be inserted into the linked list of nodes shown in FIG. 5A. The new range 530 desires to acquire elements 15-18 of the range. The method first determines that the first range 500 in the linked list of nodes defines an acquired range prior to the start of the new range 530. The method therefore advances to check for insertion prior to the second range 510.

FIG. 4C illustrates a new range 530 to be inserted into the linked list of nodes shown in FIG. 5A prior to the second range 510. The method first determines that the second range 510 the linked list of nodes defines an acquired range that ends after the start of the new range 530. The method then determines that the new range 530 does not overlap the second range 510 as the new range 430 ends prior to the start of the second range 510. The method therefore determines to insert the new range 530 prior to the second range 510.

Figure 5D:
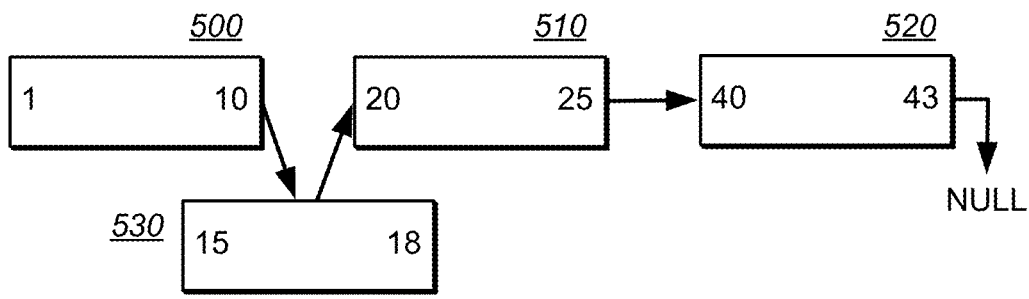

FIG. 5D illustrates a new range 530 inserted into the linked list of nodes shown in FIG. 5A prior to the second range 510. The next field 204 of the first range 500 is copied to the next field 204 of the new range 530 and the next field 204 of the first range 510 is atomically updated to link to the new range 530. Once the atomic update is complete, the new range has been acquired.

Acquiring Ranges for Exclusive and Non-Exclusive Use

Figure 6A:
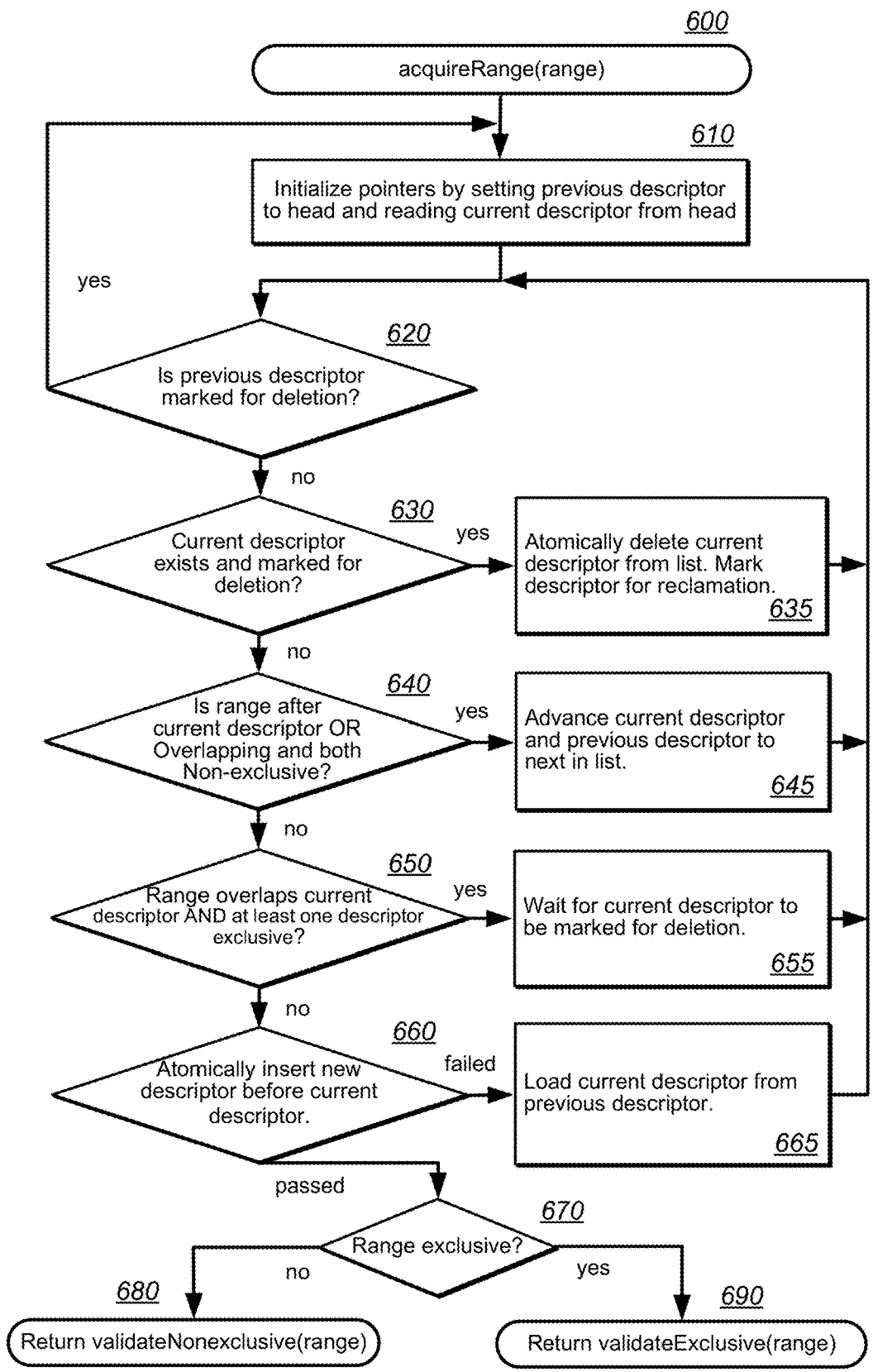
FIGS. 6A-6C are flow diagrams collectively illustrating one embodiment of atomically acquiring a lock on a range of data elements of a shared resource for exclusive or non-exclusive use.
Figure 6B:
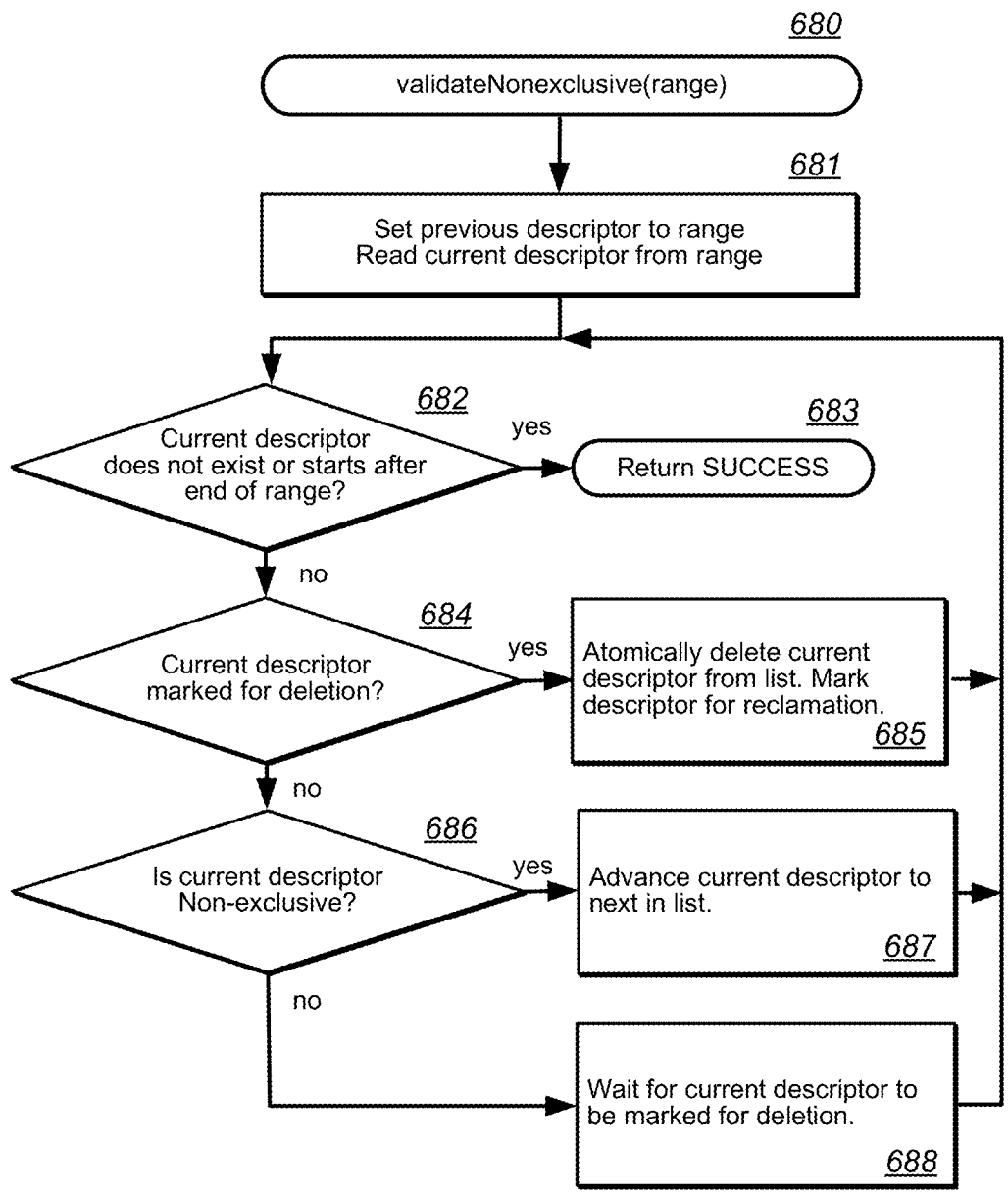
Figure 6C:
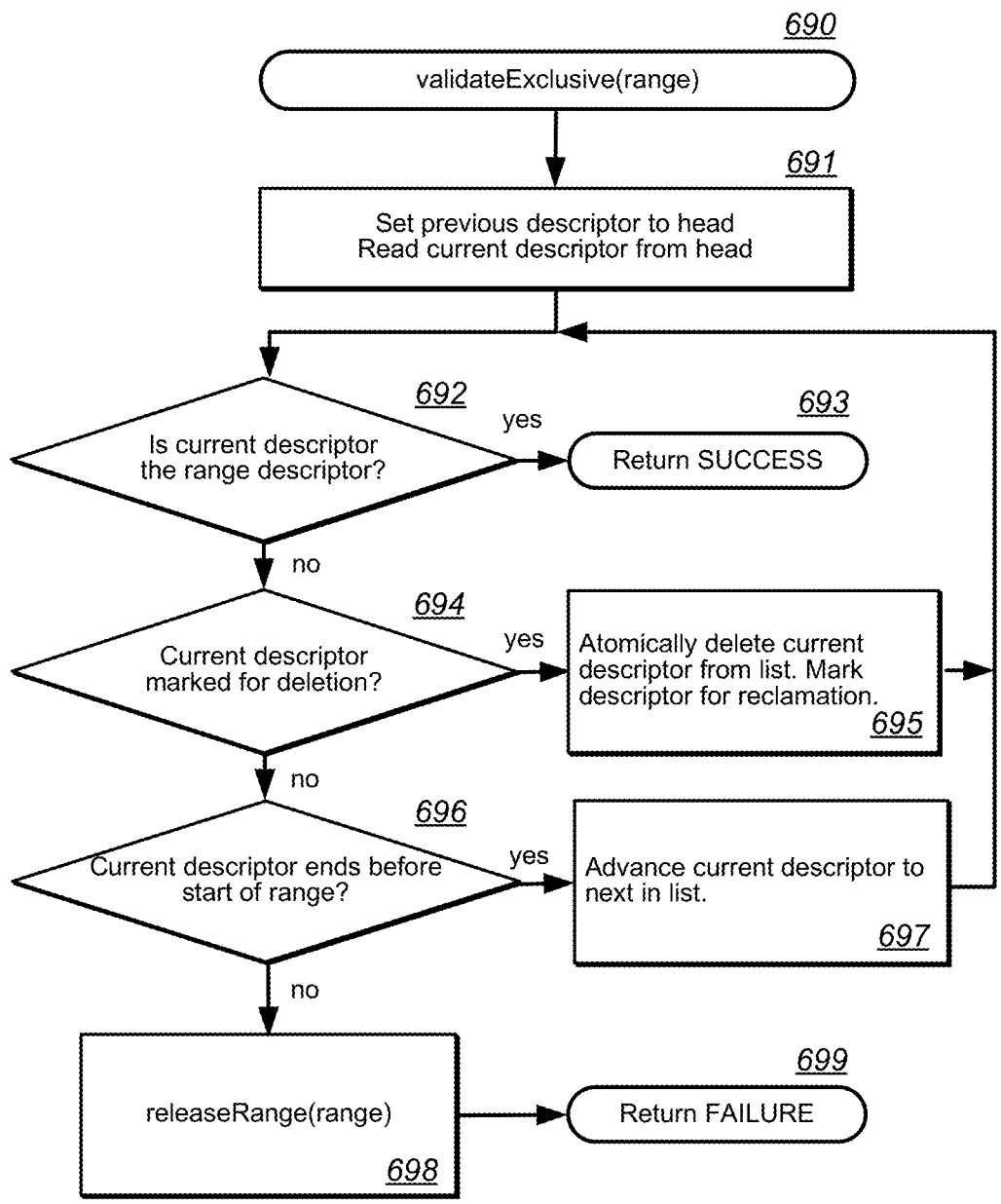

FIGS. 6A-6C are flow diagrams illustrating one embodiment of atomically acquiring a lock on a range of data elements of a shared resource for both exclusive and non-exclusive use. With non-exclusive locks of ranges of data elements, overlapping of ranges may occur. The embodiment employs a linked list of nodes where each node in the list includes a descriptor that describes an acquired range and a link to a next node descriptor in the list. The node descriptor is further described above in FIG. 2. The list is sorted in ascending order based on the starting values of each range in the list. In addition, the list includes a controlling descriptor that includes a link to a first node descriptor, or a list head pointer, in the list. This controlling descriptor may be provided using a node descriptor structure or any number of other data structures in various alternative embodiments. Initially, the list is empty. This may be indicated by an initial value of the list head pointer value of zero or NULL which indicates that no more elements exist in the list. This indication is not intended to be limiting and any suitable means for indicating an end to the list may be employed. In order to acquire a range of elements, an executing thread must successfully insert a corresponding range descriptor into the list.

An embodiment of the method of FIG. 6A begins at step 600 where the method is invoked with a range descriptor defining a range of elements desired to be acquired for exclusive or non-exclusive use. The method employs an identifier of the current descriptor in the list as well as a previous identifier of the link to the current descriptor contained either in a previous range descriptor or the controlling descriptor of the list.

The method proceeds to step 610 where the previous identifier is initialized with the list head pointer and the current descriptor is initialized with the first descriptor in the list, as identified by the value contained in the list head pointer. In alternative embodiments that include extensions for low contention operation such as described below in FIGS. 8A-8C, this step may be extended as described in FIG. 8B. The method continues to step 620. As discussed above in FIG. 2, the range descriptor maintains an indicator that it is marked for deletion within the link to a next node descriptor. Therefore, step 620 determines if the previous descriptor has been marked for deletion. If the previous descriptor is marked for deletion, the method restarts at step 610. Otherwise, the method proceeds to step 630.

In step 630, the method determines if the current descriptor exists and is marked for deletion. If the current descriptor is not marked for deletion or does not exist, the method proceeds to step 640. Otherwise, the method proceeds to step 635 where the current descriptor is deleted from the list by copying the next descriptor identified in the current descriptor into the previous identifier and the method returns to step 620.

In step 640, the method determines if the current descriptor exists and if the desired range and current descriptor are overlapping and both ranges are non-exclusive, as indicated by the Exclusive field 203 of the descriptors, and the current descriptor starts before the desired range, as defined by the Start field 201 of desired range descriptor and of the current descriptor, or the desired range begins after the end of the current descriptor as defined by the Start field 201 of desired range descriptor and the End field 202 of the current descriptor. If this determination is true, the method proceeds to step 645 where the identifier of the current descriptor and the previous identifier of the link to the current descriptor are advanced to the next descriptors in the list and the method returns to step 620. Otherwise the method proceeds to step 650.

In step 650, the method determines if the current descriptor exists, overlaps with the current descriptor and at least one of the ranges indicates an exclusive lock, as indicated by the Exclusive field 203 of the descriptors. As an exclusive lock of a range of data elements precludes acquisition of any element within the range by another entity, no overlapping of ranges may occur. Therefore, if the determination is true, the method proceeds to step 655 where the method waits for the current descriptor to be marked for deletion. The method then returns to step 620. If the desired range does not overlap with the current descriptor the method proceeds to step 660.

In step 660 the method has determined the location where the desired range descriptor is to be inserted. The method inserts the desired range descriptor before the current descriptor using an atomic Compare-And-Swap (CAS) instruction to update the value of the previous identifier. As other threads may be concurrently executing the method, multiple threads may contend for the updating of the previous identifier and the CAS instruction could fail. If the CAS instruction fails, the method proceeds to step 665 where the current descriptor is loaded from the previous identifier (which has been updated by another thread). The method then returns to step 620. If the CAS instruction passes, the desired range has been successfully added to the list and the range is tentatively acquired but the acquisition must be validated. The method proceeds to step 670 where the lock of the desired range is determined to be for exclusive use. If the lock of the desired range is for exclusive use, the method proceeds to step 590 where validation is performed for an exclusive lock as shown below in FIG. 6C. Otherwise the method proceeds to step 680 where validation is performed for a non-exclusive lock as shown below in FIG. 6B.

An embodiment of the method of FIG. 6B begins at step 680 where the method is invoked with a specified range descriptor defining a non-exclusive lock of a range of elements within the list to be validated. The method proceeds to step 681 where the previous identifier is initialized to identify the specified range descriptor and the current descriptor is initialized with the first descriptor after the specified range, as identified by the next field 204 contained specified range descriptor. The method continues to step 682 where the method determines if the current descriptor does not exist or if the specified range ends before the start of the current descriptor as defined by the Start field 201 of current range descriptor and the End field 202 of the specified descriptor. If the determination is false, the method proceeds to step 684. Otherwise, the method completes at step 683 and returns an indicator of successful validation.

In step 684, the method determines if the current descriptor marked for deletion. If the current descriptor is not marked for deletion, the method proceeds to step 686. Otherwise, the method proceeds to step 685 where the current descriptor is deleted from the list by copying the next descriptor identified in the current descriptor into the previous identifier and the method returns to step 682.

In step 684, the method determines if the current descriptor is describes a non-exclusive lock of range. If the lock is non-exclusive, the method proceeds to step 687 where the identifier of the current descriptor and the previous identifier of the link to the current descriptor are advanced to the next descriptors in the list and the method returns to step 682. Otherwise, the method proceeds to step 688 where the method waits for the current descriptor to be marked for deletion. The method then returns to step 682.

An embodiment of the method of FIG. 6C begins at step 690 where the method is invoked with a specified range descriptor defining an exclusive lock of a range of elements within the list to be validated. The method proceeds to step 691 where the previous identifier is initialized with the list head pointer and the current descriptor is initialized with the first descriptor in the list, as identified by the value contained in the list head pointer. The method continues to step 692 where the method determines if the current descriptor is the specified range descriptor. If the current descriptor is not the specified range descriptor, the method proceeds to step 694. Otherwise, the method completes at step 693 and returns an indicator of successful validation.

In step 694, the method determines if the current descriptor is marked for deletion. If the current descriptor is not marked for deletion, the method proceeds to step 696. Otherwise, the method proceeds to step 695 where the current descriptor is deleted from the list by copying the next descriptor identified in the current descriptor into the previous identifier and the method returns to step 692.

In step 696, the method determines if the specified range starts after the end of the specified range as defined by the Start field 201 of specified range descriptor and the End field 202 of the current descriptor. If this determination is true, the method proceeds to step 697 where the identifier of the current descriptor and the previous identifier of the link to the current descriptor are advanced to the next descriptors in the list and the method returns to step 692. Otherwise, the method has detected an overlap condition which is not allowed for exclusive locks of ranges. The method proceeds to step 698 where the specified range descriptor is marked for deletion as shown in FIG. 3 above and the method ends at step 699 where the validation returns an indicator of failed validation.

Figure 7A:
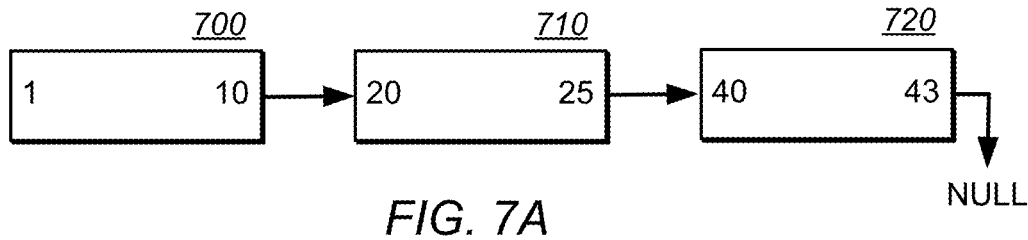
FIGS. 7A-7J are diagrams collectively illustrating a two new range descriptors simultaneously being added into the linked list of nodes using the embodiment of the method shown in FIGS. 6A-6C.

FIGS. 7A-7J are diagrams collectively illustrating two new range descriptors simultaneously being added into the linked list of nodes using the embodiment of the method shown in FIGS. 6A-6C. FIG. 7A illustrates the initial state of the linked list of nodes prior to the acquisition of the additional range. Three ranges are currently acquired and are represented in the linked list of nodes sorted in ascending order based on the starting values of each range in the list. The first range 700 has acquired a non-exclusive lock of elements 1-10 of the shared resource and is linked to the second range 710. The second range 710 has acquired a non-exclusive lock of elements 20-25 of the shared resource and is linked to the third range 720. The third range 620 has acquired a non-exclusive lock of elements 40-43 of the shared resource and contains a NULL value in its next field 204, indicating the end of the linked list.

Figure 7B:
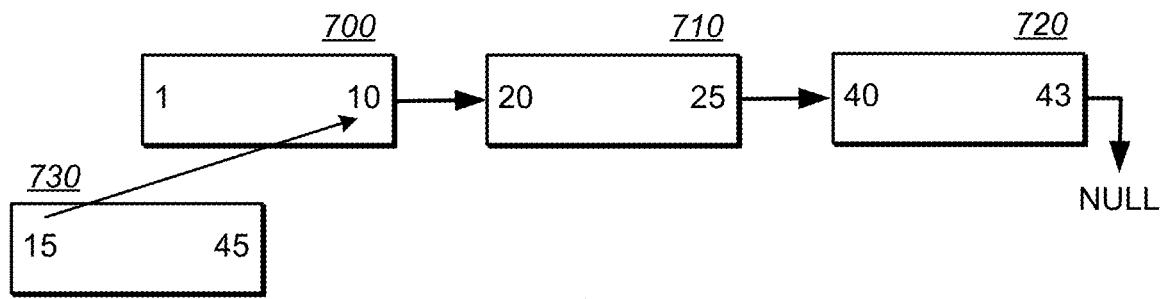

FIG. 7B illustrates a new range 730 to be inserted into the linked list of nodes shown in FIG. 7A. The new range 730 desires to acquire a non-exclusive lock of elements 15-45 of the range. The method first determines that the first range 700 in the linked list of nodes defines an acquired range prior to the start of the new range 730. The method therefore advances to check for insertion prior to the second range 710.

Figure 7C:
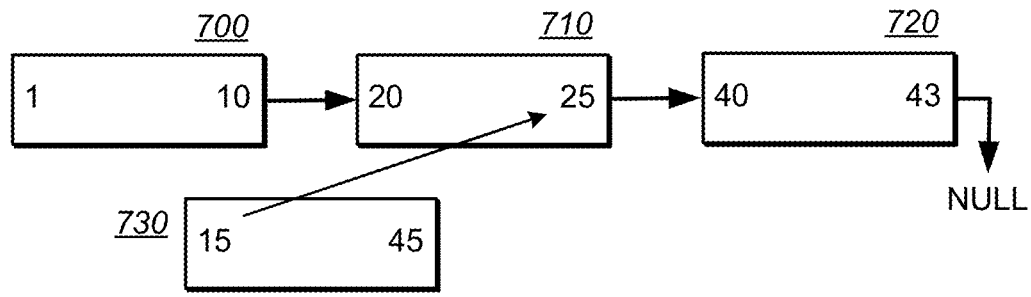

FIG. 7C illustrates a new range 730 to be inserted into the linked list of nodes shown in FIG. 7A prior to the second range 710. The method first determines that the second range 710 the linked list of nodes defines an acquired range that ends after the start of the new range 730. Although the new range 730 does overlap the second range 710, both locks of ranges are non-exclusive, therefore the overlap is allowed. The method therefore determines to insert the new range 730 prior to the second range 710.

Figure 7D:
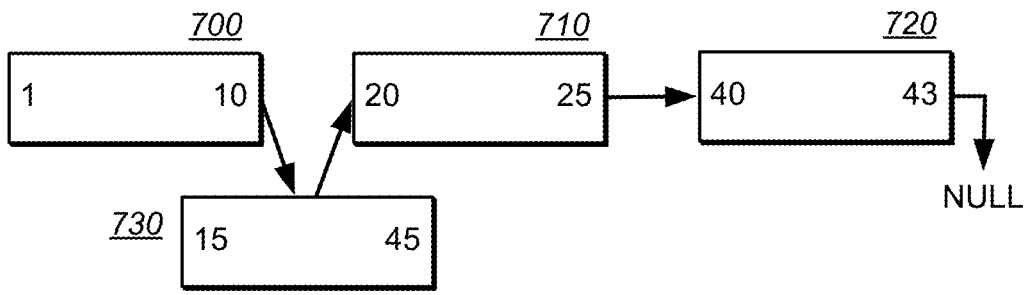

FIG. 7D illustrates a new range 730 inserted into the linked list of nodes shown in FIG. 7A prior to the second range 710. The next field 204 of the first range 700 is copied to the next field 204 of the new range 730 and the next field 204 of the first range 710 is atomically updated to link to the new range 730. Once the atomic update is complete, the new non-exclusive lock of the range has been tentatively acquired but must be validated as shown in FIGS. 7I-7J below.

Figure 7E:
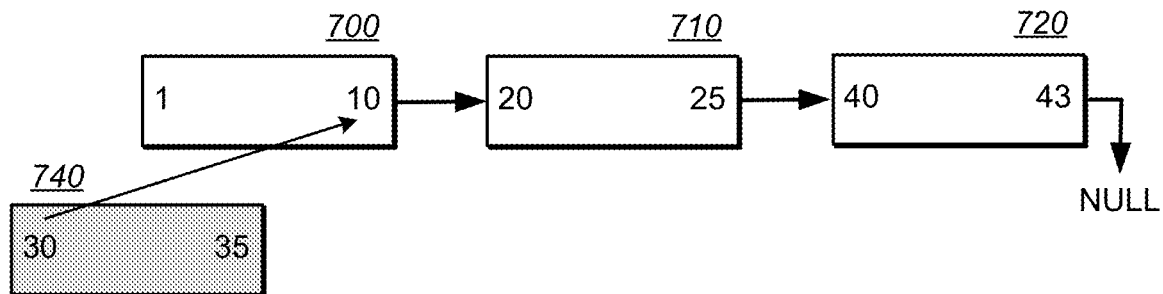

FIG. 7E illustrates a new range 740 to be inserted into the linked list of nodes shown in FIG. 7A. While the insertion of the new range 730, as shown in FIGS. 7B-7D, occurs simultaneously, new range 630 is omitted in FIGS. 7E-7H for clarity. The new range 740 desires to acquire an exclusive lock of elements 30-35 of the range. The method first determines that the first range 700 in the linked list of nodes defines an acquired range prior to the start of the new range 740. The method therefore advances to check for insertion prior to the second range 710.

Figure 7F:
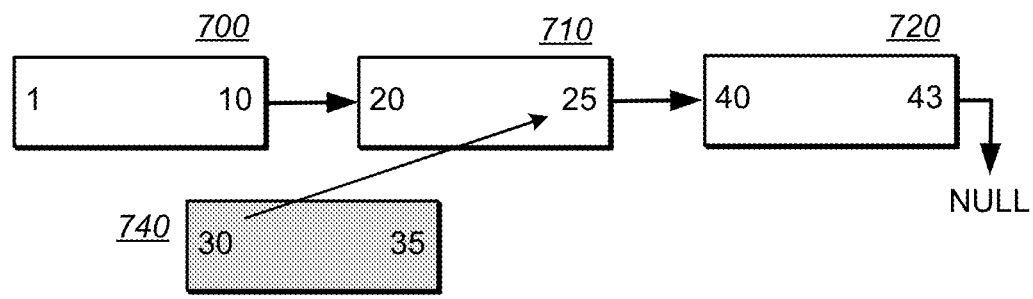

FIG. 7F illustrates a new range 740 to be inserted into the linked list of nodes shown in FIG. 7A prior to the second range 710. The method first determines that the second range 710 the linked list of nodes defines an acquired range prior to the start of the new range 740. The method therefore advances to check for insertion prior to the third range 720.

Figure 7G:
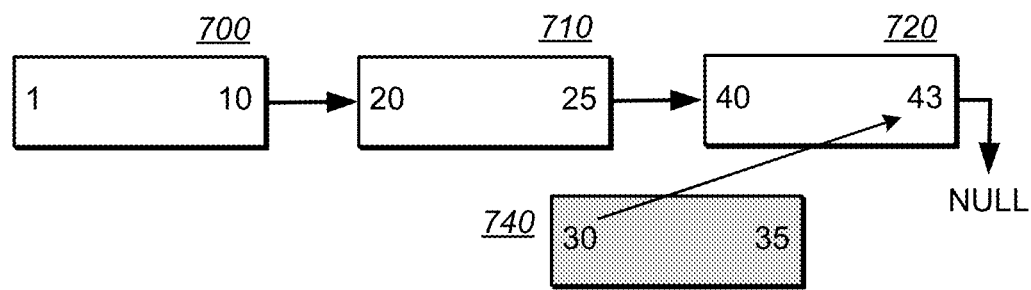

FIG. 7G illustrates a new range 740 to be inserted into the linked list of nodes shown in FIG. 7A prior to the third range 720. The method first determines that the third range 720 the linked list of nodes defines an acquired range that ends after the start of the new range 740. As the new lock of range 740 requires exclusive access, the method then determines that the new range 740 does not overlap the third range 720 as the new range 740 ends prior to the start of the third range

720. The method therefore determines to insert the new range 740 prior to the third range 720.

Figure 7H:
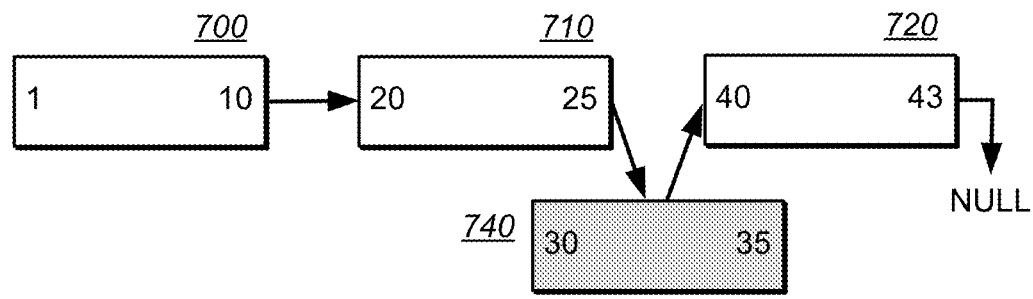
Figure 7I:
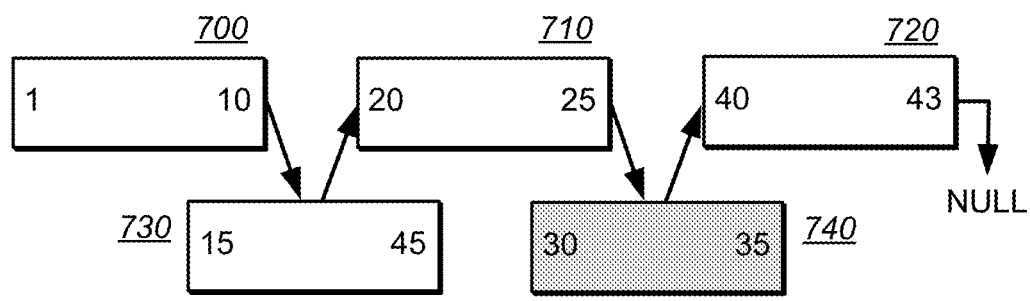
Figure 7J:
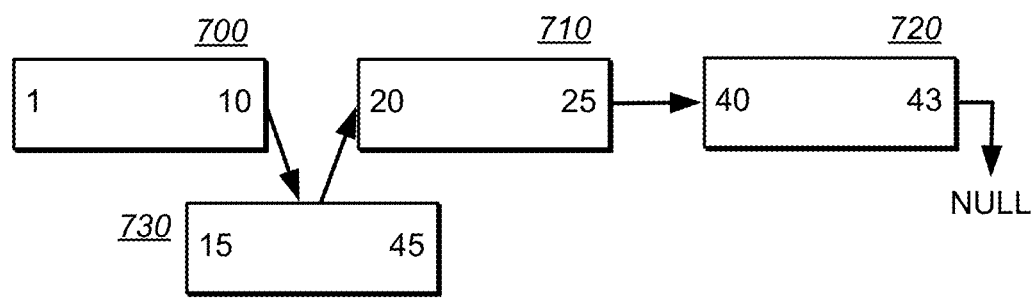

FIG. 7H illustrates a new range 740 inserted into the linked list of nodes shown in FIG. 7A prior to the third range 720. The next field 204 of the second range 710 is copied to the next field 204 of the new range 740 and the next field 204 of the second range 720 is atomically updated to link to the new range 740. Once the atomic update is complete, the new exclusive lock of the range has been tentatively acquired but must be validated for exclusive use as shown in FIG. 7J below.

FIG. 7I illustrates the condition where new ranges 730 and 740 have been tentatively acquired but have yet to be validated. As the new locks of ranges 730 and 740 overlap and new lock of range 740 is exclusive, the validation method must result in the removal of at least one of the new locks.

The validation of new range 730 is performed as described in FIG. 6B. The validation method starts with range 710 and considers ranges 710, 740 and 720 as all three ranges overlap with new range 730. As the locks of ranges 710 and 720 are non-exclusive, the validation method will advance past these ranges without taking action. As the lock of range 740 is exclusive, the validation method must wait for the range 740 to be marked for deletion. Once range 740 is marked for deletion, the validation method removes range 740 from the list, verifies that the lock of range 720 is non-exclusive and returns a successful completion.

The validation of new range 740 is performed as described in FIG. 6C. The validation method starts with range 700 and considers ranges 700 and 730. First, the validation method determines that range 600 does not overlap with new range 740 and moves to range 730. The validation method then determines that range 730 does overlap with new range 740. As a result, the validation method marks new range 740 for deletion and returns a failed completion.

FIG. 7J illustrates the linked list of nodes after completion of the validation methods for both new ranges 730 and 740. As the new lock of range 740 is exclusive and overlaps with new range 730, the acquisition of the new lock of range 740 fails and range descriptor 740 is no longer a member of the linked list of nodes. As the new lock of range 730 is non-exclusive the acquisition of the new lock of range 730 succeeds and range descriptor 730 is inserted into a sorted position in the linked list of nodes.

Optimization for Low Contention Operation

Figure 8A:
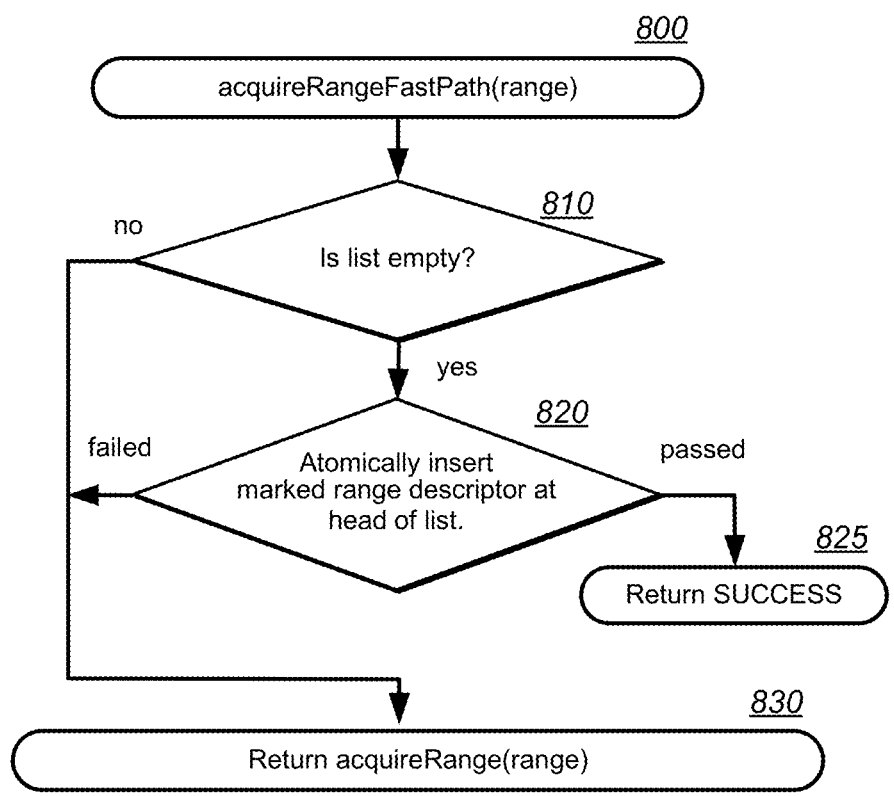
FIGS. 8A-8C are flow diagrams collectively illustrating extensions to atomically acquiring and releasing a range of data elements of a shared resource that provide optimizations for low contention operation.
Figure 8B:
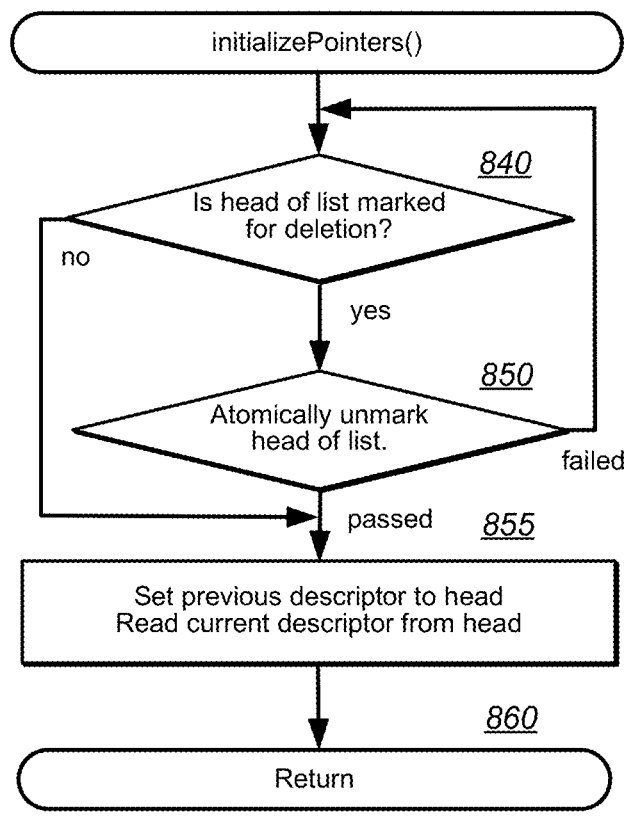
Figure 8C:
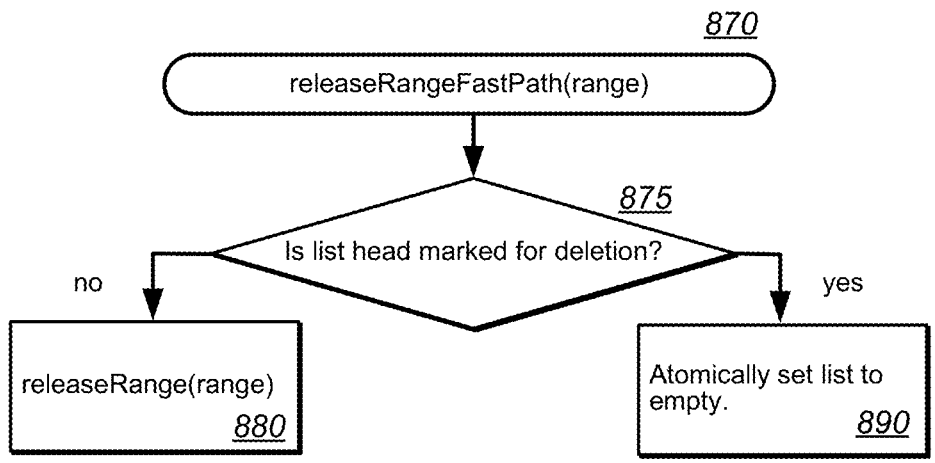

FIGS. 8A-8C are flow diagrams collectively illustrating extensions to atomically acquiring and releasing a range of data elements of a shared resource that provide optimizations for low contention operation. As these extensions do not rely on modifications made to the acquiring and releasing methods described herein, they may be used in combination with the embodiments such as described in FIG. 4 and FIGS. 6A-6C as well as in combination with the acquisition fairness extension described in FIG. 9 below.

FIG. 8A is a flow diagram illustrating one embodiment of an extension to atomically acquiring a lock on a range of data elements of a shared resource. The embodiment of the method of FIG. 8A begins at step 800 where the method is invoked with a range descriptor defining a range of elements desired to be acquired. The method employs an identifier of the current descriptor in the list as well as a previous identifier of the link to the current descriptor contained either in a previous range descriptor or the controlling descriptor of the list.

The method proceeds to step 810 where a determination is made that the list is empty as indicated by the list head pointer containing an indicator of list termination such as a zero or NULL value. If it is determined that the list is not empty, the method proceeds to step 830 where the acquireRange method described in either FIG. 4 or FIGS. 6A-6C is performed, otherwise the method proceeds to step 820.

In step 820, the desired range descriptor is atomically inserted at the head of the list by writing the address of the desired range descriptor to the list head pointer. However, the address of the desired range descriptor is marked for deletion prior to being written. As the list head pointer itself is not a range descriptor of the list, it cannot be marked for deletion by the acquisition methods of FIG. 4 and FIGS. 6A-6C. Thus, the marking of the list head pointer indicates that the desired range descriptor was added to the list via a fast path mechanism. If the descriptor is successfully added to the list, the method proceeds to step 825 where the acquisition is complete and the method returns a successful completion, otherwise the method proceeds to step 830 where the acquireRange method described in either FIG. 4 or FIGS. 6A-6C is performed.

FIG. 8B is a flow diagram illustrating one embodiment of an extension to a method of initializing pointers as shown in step 410 of FIG. 4 and step 610 of FIG. 6A. As the head list pointer may contains an address marked for deletion indicating a range added to the list via a fast path mechanism, should additional ranges be added to the list, the first range in the list may not be removed via a fast path mechanism. The method begins at step 840 where the method determines if the head list pointer contains an address marked for deletion. If the head list pointer contains an address marked for deletion, the method proceeds to step 850 where the method atomically updates the list head pointer with an unmarked address of the current contents of the head list pointer. If the atomic update operation fails, the method returns to step 840. If the atomic update operation succeeds, or if the head list pointer in step 840 does not contain an address marked for deletion, the method proceeds to step 855 where the previous identifier is initialized with the list head pointer and the current descriptor is initialized with the first descriptor in the list, as identified by the value contained in the list head pointer. The method then proceeds to step 860 where the method returns to the calling acquireRange method described in either FIG. 4 or FIGS. 6A-6C.

FIG. 8C is a flow diagram illustrating one embodiment of an extension to atomically releasing a range of data elements of a shared resource. The method begins at step 870 where the method is invoked with a range descriptor defining a range of elements to be released. The method then proceeds to step 875 where a determination is made whether the list head pointer contains an address marked for deletion. As the list head pointer itself is not a range descriptor of the list and cannot be marked for deletion by the acquisition methods as discussed above, the marking of the list head pointer indicates that the desired range descriptor was added to the list via a fast path mechanism. In this case, the method proceeds to step 890 where the list is atomically set to empty by using a CAS instruction to write an indicator of list termination such as a zero or NULL value to the list head pointer. If the list head pointer does not contain an address marked for deletion, the method proceeds to step 880 where the releaseRange method described in FIG. 3 is called.

Optimization for Fairness

Figure 9:
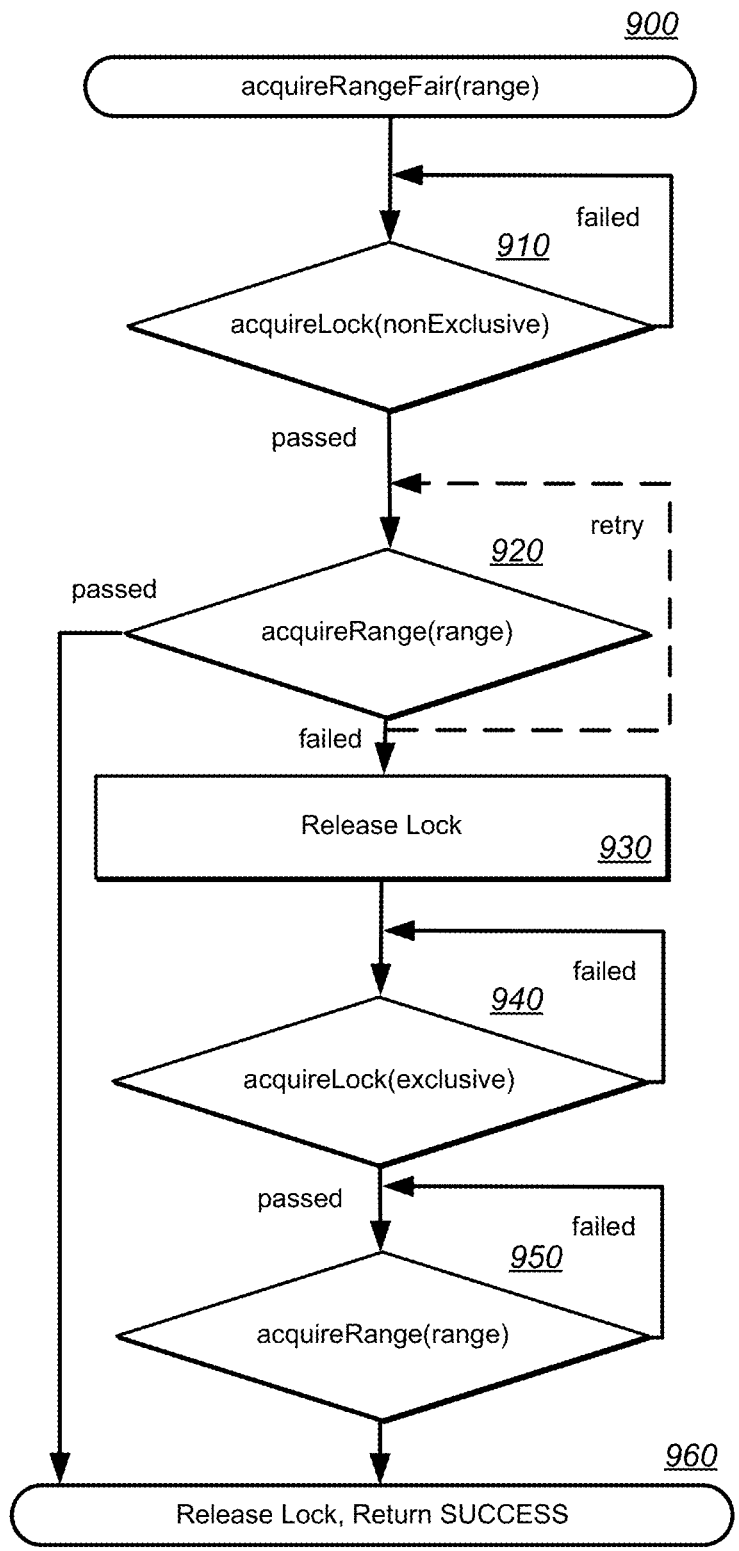
FIG. 9 is a flow diagram illustrating extensions to atomically acquiring a lock on a range of data elements of a shared resource that provides optimizations for fairness.

FIG. 9 is a flow diagram illustrating extensions to atomically acquiring a lock on a range of data elements of a shared resource that provides optimizations for fairness. As traditional range lock implementations may add range descriptors to the controlling data structure prior to acquisition, fairness in these implementations may be inherent. Embodiments of the range lock such as those described in FIGS. 6A-6C and FIG. 8A do not add range descriptors to the list until acquisition is be completed. As a result, fairness in these embodiments may not be ensured. The extension described in FIG. 9 may be added to the various embodiments of the acquisition methods described herein to provide optimizations for fairness.

The various embodiments of the method of FIG. 9 begins at step 900 where the method is invoked with a range descriptor defining a range of elements desired to be acquired. The method employs an identifier of the current descriptor in the list as well as a previous identifier of the link to the current descriptor contained either in a previous range descriptor or the controlling descriptor of the list.

The method proceeds to step 910 where a lock associated with the list is allocated for non-exclusive access to the list. Should this allocation fail, the allocation may be retried until it succeeds. The method then proceeds to step 920.

In step 920, the method attempts to acquire the desired range by calling an embodiment of the range lock such as those described in FIGS. 6A-6C and FIG. 8A. Should the desired lock of the range be non-exclusive, this acquisition may be expected to succeed. However, if the desired lock of the range is exclusive this acquisition may fail. If the allocation succeeds, the method proceeds to step 960. Otherwise, the method may optionally retry a finite number of times by returning to step 920. However, if an allowable number of retries is exhausted without success, the method proceeds to step 930.

In step 930, the method releases the lock for non-exclusive use and proceeds to step 840 where the lock associated with the list is allocated for exclusive access to the list. Should the allocation fail, the method returns to step 940. Once the lock is allocated for exclusive use, the method proceeds to step 950. In some embodiments, the lock may be allocated for exclusive use once no other lock for exclusive use exists, while in other embodiments the lock may be allocated for exclusive use after all other lock allocations have been released. While lock is allocated for exclusive use no other locks may be allocated.

In step 950, the method attempts to acquire the desired range by calling an embodiment of the range lock such as those described in FIGS. 6A-6C and FIG. 8A. In embodiments where the lock may be allocated for exclusive use once no other lock for exclusive use exists, the range lock acquisition may fail. In such case, the method indefinitely retries by returning to step 950. In other embodiments the range lock acquisition may always succeed. Once the desired range is acquired, the method proceeds to step 960.

In step 960, the desired range has been acquired. The lock for the list is released and the method returns a successful completion.

In the above method, any of a variety of locks may be employed. In a preferred embodiment, a conventional reader-writer lock may be employed. This type of lock, however, is not intended to be limiting and any suitable lock may be employed. Furthermore, some embodiments may prefer to implement reader-writer lock semantics within the method described above using more basic synchronization primitives such as mutexes, semaphores, condition variables and counters for performance reasons. Any number of such locking mechanisms may be contemplated.

Range Descriptor Reclamation

In the various embodiments of range locks, multiple threads may access the list structure without synchronization. While this improves parallelism, lockless access to the list structure allows multiple threads simultaneous access to all nodes in the list, even if such nodes are marked for deletion. As a result, threads may continue to access nodes after removal from the list. For this reason, nodes removed from the list may not be immediately reclaimed for future use but must wait until all possible threads no longer can access the node.

An epoch-based reclamation scheme may be employed to address this synchronization issue. In addition to an allocation pool for available range descriptors, a reclamation pool may be maintained. Initially, the allocation pool contains a number of available range descriptors chosen for performance considerations while the reclamation pool is empty. As range descriptors are deleted from the list they are added to the reclamation pool. Once the allocation pool is empty, range descriptors from the reclamation pool must be transferred to the allocation pool. To accomplish this, a thread desiring to reclaim descriptors must synchronize with all other threads.

Each thread maintains an integer epoch counter. Initially, each epoch counter contains an inactive value which may defined as either odd or even. Upon entry to an acquisition operation, a thread may increment the respective epoch counter, transitioning the state of the counter to an active value. Upon completion of an acquisition operation, a thread may again increment the respective epoch counter, transitioning the state of the counter back to an inactive value. Any thread indicated to be in an inactive state will not have access to the list structure or any descriptors on the reclamation pool. The above description of an epoch counter is not intended to be limiting and various other embodiments may use different forms of epoch mechanisms and update mechanism, for example enumerated or boolean epoch variables which are updated by writing active and inactive states to the variables, To synchronize with other threads, a thread desiring the reclaim descriptors must execute a barrier method.

Figure 10:
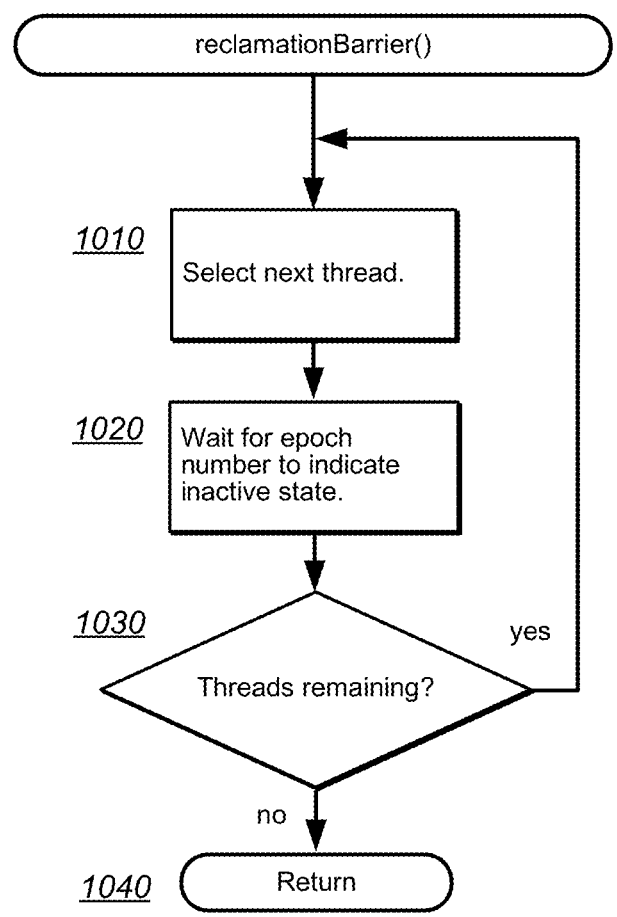
FIG. 10 is a flow diagram illustrating one embodiment of a barrier method for synchronizing threads to reclaim deleted range descriptors.

FIG. 10 is a flow diagram illustrating one embodiment of a barrier method for synchronizing threads to reclaim deleted range descriptors. The method begins at step 1010 where a thread sharing access to the list structure is selected. The method then proceeds to step 1020 where the epoch state for the selected thread may be evaluated. If the epoch number indicates that the selected thread is in an active state, the barrier method must wait for the epoch number to transition to an inactive state. Once the epoch number indicates that the selected thread is in an inactive state, the method proceeds to state 1030 where the number of remaining threads is determined. If no threads remain, the method proceeds to step 1040 where the method is complete. Otherwise, the method returns to step 1010.

Once the barrier method completes, a thread executing the barrier function can safely transfer descriptors from the reclamation pool to the allocation pool as no descriptors in the reclamation pool are accessible by any threads sharing the resource. Note that while a single allocation pool and reclamation pool are described, the number of pools maintained is not intended to be limiting and various embodiments may implement any number of pools or pool allocation strategies. For example, each shared resource may maintain its own set of pools and/or each thread accessing a shared resource may maintain its own set of pools. Furthermore, other synchronization methods may be employed, for example the Read-Copy-Update method may provide an appropriate synchronization mechanism. Therefore, the embodiment of the barrier method described in FIG. 10 is not intended to be limiting and other synchronization methods may be envisioned.

Figure 11:
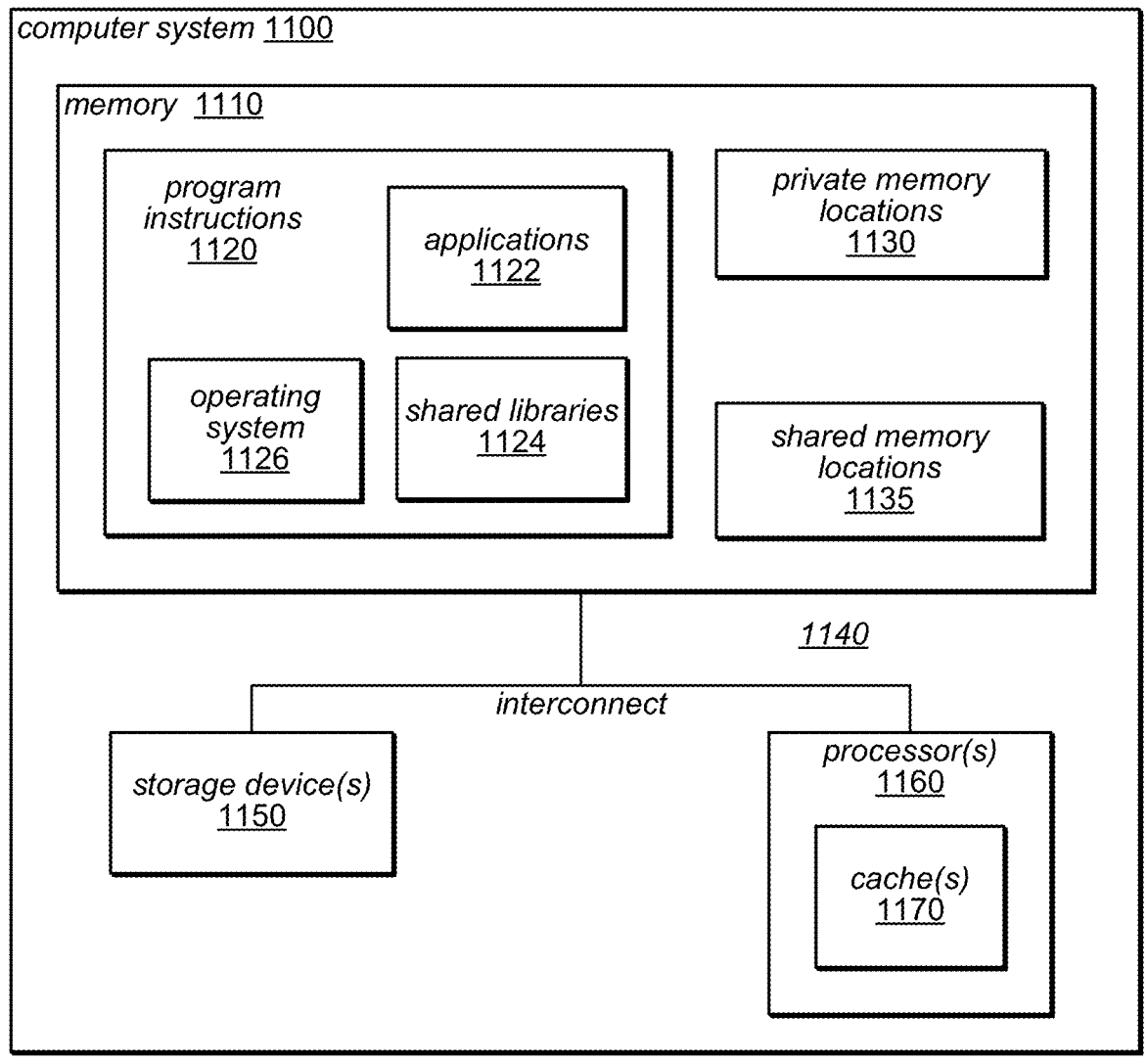
FIG. 11 is a block diagram illustrating one embodiment of a computing system that is configured to implement scalable range acquisition operations, as described herein.

The techniques and methods described herein may be implemented on or by any of a variety of computing systems in different embodiments. For example, FIG. 11 is a block diagram illustrating one embodiment of a computing system that is configured to implement such techniques and methods according to various embodiments. The computer system 1100 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

Some of the mechanisms described herein may be provided as a computer program product, or software, that may include a non-transitory, computer-readable storage medium having stored thereon instructions which may be used to program a computer system 1100 (or other electronic devices) to perform a method according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1100 may include one or more processors 1160; each may include multiple cores, any of which may be single- or multi-threaded. For example, multiple processor cores may be included in a single processor chip (e.g., a single processor 1160), and multiple processor chips may be included in computer system 1100. The computer system 1100 may also include one or more storage devices 1150 (e.g. optical storage, magnetic storage, hard drive, tape drive, solid state memory, etc.) and one or more system memories 1110 (e.g., one or more of cache, SRAM, DRAM, RDRAM, EDO RAM, DDR RAM, SDRAM, Rambus RAM, EEPROM, etc.). In some embodiments, one or more of the storage device(s) 1150 may be implemented as a module on a memory bus (e.g., on interconnect 1140) that is similar in form and/or function to a single in-line memory module (SIMM) or to a dual in-line memory module (DIMM). Various embodiments may include fewer or additional components not illustrated in FIG. 11 (e.g., video cards, audio cards, additional network interfaces, peripheral devices, a network interface such as an ATM interface, an Ethernet interface, a Frame Relay interface, etc.)

The one or more processors 1160, the storage device(s) 1150, and the system memory 1110 may be coupled to the system interconnect 1140. One or more of the system memories 1110 may contain program instructions 1120. Program instructions 1120 may be executable to implement one or more applications 1122, shared libraries 1124, and/or operating systems 1126.

Program instructions 1120 may be encoded in platform native binary, any interpreted language such as Java™ byte-code, or in any other language such as C/C++, the Java™ programming language, etc., or in any combination thereof. In various embodiments, applications 1122, operating system 1126, and/or shared libraries 1124 may each be implemented in any of various programming languages or methods. For example, in one embodiment, operating system 1126 may be based on the Java programming language, while in other embodiments it may be written using the C or C++ programming languages. Similarly, applications 1122 may be written using the Java programming language, C, C++, or another programming language, according to various embodiments. Moreover, in some embodiments, applications 1122, operating system 1126, and/shared libraries 1124 may not be implemented using the same programming language. For example, applications 1122 may be C++ based, while shared libraries 1124 may be developed using C.

In some embodiments, the program instructions 1120 may include MCAS support and/or other functions, operations, or procedures for implementing multithreaded applications that access shared resources, as described herein. Such support and functions may exist in one or more of the shared libraries 1124, operating systems 1126, or applications 1122, in various embodiments. The system memory 1110 may further comprise private memory locations 1130 and/or shared memory locations 1135 where data may be stored. For example, in some embodiments, shared memory locations may store data, metadata, or other shared resources that are accessible to multiple, concurrently executing threads, processes, or transactions, in various embodiments. In some embodiments, private memory locations 1130 and/or shared memory locations may store thread-local flags, state information, and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of operations that support synchronization within multi-threaded applications that access particular shared resources, it should be noted that the techniques and mechanisms disclosed herein for accessing and/or operating on shared resources may be applicable in other contexts in which applications access and/or operate on different types of shared resources than those described in the examples herein. It is intended that the following claims be interpreted to embrace all such variations and modifications. In addition, the many embodiments described herein rely on a linked list data structure employing a single link for each node. Further embodiments may be contemplated where the data structure may include multiple links. If such a data structure were employed, an atomic update operation might be required to update multiple node fields. Synchronization primitives such as the Multiple Compare-And-Swap (MCAS) primitive may be employed for this purpose. Therefore, the use of a singly linked list as the underlying range data structure is not intended to be limiting. Furthermore, the validation methods described above in FIGS. 7b-c are not intended to be limiting as alternative data structures employing, for example, multiply-linked lists may enable more efficient validation methods to be employed.

In conclusion, multiple embodiments of scalable range locks are described. These locks employ a simple underlying structure, a concurrent linked list, to identify currently acquired ranges. This structure allows simple lock-less modifications with just one atomic instruction. Therefore, these embodiments avoid the pitfall of conventional range locks and do not require an auxiliary lock in the common case. As a result, these range locks provide superior performance and scale across all thread counts in a variety of applications.

What is claimed:

1. A method, comprising:
performing, by a computer comprising one or more processors and memory implementing a plurality of threads, a lock acquisition operation on a first range of elements of a shared resource, the first range comprising a plurality of elements, and the performing comprising:
verifying that no currently locked ranges of elements of the shared resource overlap the first range, comprising:
scanning a linked list of descriptors of currently locked ranges to identify locked ranges of elements overlapping the first range comprising the plurality of elements, wherein the descriptors for the currently locked ranges each comprise a link to a next descriptor; and
waiting for each of the identified overlapping locked ranges of elements to be released; and
executing, subsequent to the verifying, an atomic operation to insert a descriptor for the first range into the linked list of descriptors of currently locked ranges to acquire a lock for the plurality of elements of the first range of elements of the shared resource, wherein the atomic operation comprises determining that no ranges overlapping the first range have been added to the linked list of descriptors;
wherein the lock acquisition operation executes on a particular thread of the plurality of threads, and wherein the performing of the lock acquisition operation does not exclude access to the linked list of descriptors by other threads of the plurality of threads.

2. The method of claim 1, wherein the atomic operation comprises performing an atomic compare and swap operation on the link to a next descriptor of a descriptor of a currently locked range.

3. The method of claim 1, wherein the lock acquisition operation on the first range of elements acquires a non-exclusive lock, wherein the descriptor for the first range comprises an indicator of a non-exclusive lock, and wherein the identified locked ranges of elements overlapping the first range exclude currently locked ranges comprising respective descriptors indicating non-exclusive locks.

4. The method of claim 3, the performing of the lock acquisition operation on the first range of elements further comprising:
verifying, subsequent to the inserting, that no currently locked ranges comprising respective descriptors indicating an exclusive lock overlap the first range, comprising:
scanning the linked list of descriptors of currently locked ranges comprising respective descriptors indicating exclusive locks to identify locked ranges of elements overlapping the first range; and
waiting for each of the identified overlapping exclusively locked ranges of elements to be released.

5. The method of claim 1, further comprising:
performing, by the computer, a release operation on a particular currently locked range of elements of a shared resource, comprising:
performing, on a descriptor of the particular currently locked range, an atomic fetch and add operation on the link to the next descriptor to update a particular bit of the next descriptor to indicate the particular currently locked range has been released.

6. The method of claim 1, further comprising:
performing, by the computer, a lock acquisition operation on a second range of elements of a shared resource, comprising:
determining that a head pointer for the linked list of descriptors indicates that the linked list is empty; and
inserting a descriptor for the second range into the empty linked list of descriptors to lock the second range of elements of the shared resource via a fast insertion, comprising:
writing the head pointer to the address of the descriptor for the second range; and
setting an indicator of fast insertion for the linked list of descriptors.

7. The method of claim 6, the performing of the lock acquisition operation on the first range of elements further comprising clearing the indicator of fast insertion for the linked list of descriptors.

8. One or more non-transitory computer-accessible storage media storing program instructions that when executed on or across one or more processors implementing a plurality of threads cause the one or more processors to perform a lock acquisition operation on a first range of elements of a shared resource, comprising:
verifying that no currently locked ranges of elements of the shared resource overlap the first range, the first range comprising a plurality of elements, and the verifying comprising:
scanning a linked list of descriptors of currently locked ranges to identify locked ranges of elements overlapping the first range comprising the plurality of elements, wherein the descriptors for the currently locked ranges each comprise a link to a next descriptor; and
waiting for each of the identified overlapping locked ranges of elements to be released; and
executing, subsequent to the verifying, an atomic operation to insert a descriptor for the first range into the linked list of descriptors of currently locked ranges to acquire a lock for the plurality of elements of the first range of elements of the shared resource, wherein the atomic operation comprises determining that no ranges overlapping the first range have been added to the linked list of descriptors;
wherein the lock acquisition operation executes on a particular thread of the plurality of threads, and wherein the performing of the lock acquisition operation does not exclude access to the linked list of descriptors by other threads of the plurality of threads.

9. The one or more non-transitory computer-accessible storage media of claim 8, wherein the atomic operation comprises performing an atomic compare and swap operation on the link to a next descriptor of a descriptor of a currently locked range.

10. The one or more non-transitory computer-accessible storage media of claim 8, wherein the lock acquisition operation on the first range of elements acquires a non-exclusive lock, wherein the descriptor for the first range comprises an indicator of a non-exclusive lock, and wherein the identified locked ranges of elements overlapping the first range exclude currently locked ranges comprising respective descriptors indicating non-exclusive locks.

11. The one or more non-transitory computer-accessible storage media of claim 10, the performing of the lock acquisition operation on the first range of elements further comprising:
   verifying, subsequent to the inserting, that no currently locked ranges comprising respective descriptors indicating exclusive locks overlap the first range, comprising:
   scanning the linked list of descriptors of currently locked ranges comprising respective descriptors indicating exclusive locks to identify locked ranges of elements overlapping the first range; and
   waiting for each of the identified overlapping exclusively locked ranges of elements to be released.

12. The one or more non-transitory computer-accessible storage media of claim 8 further storing program instructions that when executed on or across one or more processors cause the one or more processors to perform a release operation on a particular currently locked range of elements of a shared resource, comprising:
   performing, on a descriptor of the particular currently locked range, an atomic fetch and add operation on the link to the next descriptor to update a particular bit of the next descriptor to indicate the particular currently locked range has been released.

13. The one or more non-transitory computer-accessible storage media of claim 8 further storing program instructions that when executed on or across one or more processors cause the one or more processors to perform a second lock acquisition operation on a second range of elements of a shared resource, comprising:
   determining that a head pointer for the linked list of descriptors indicates that the linked list is empty; and
   inserting a descriptor for the second range into the empty linked list of descriptors to lock the second range of elements of the shared resource via a fast insertion, comprising:
   writing the head pointer to the address of the descriptor for the second range; and
   setting an indicator of fast insertion for the linked list of descriptors.

14. The one or more non-transitory computer-accessible storage media of claim 13, the performing of the lock acquisition operation on the first range of elements further comprising clearing the indicator of fast insertion for the linked list of descriptors.

15. A system, comprising:
   one or more processors implementing a plurality of threads and a memory, the memory comprising program instructions executable by the one or more processors to perform a lock acquisition operation on a first range of elements of a shared resource, the first range comprising a plurality of elements, and the lock acquisition operation on the first range of elements configured to:
   scan a linked list of descriptors of currently locked ranges to identify locked ranges of elements overlapping the first range comprising the plurality of elements, wherein the descriptors for the currently locked ranges each comprise a link to a next descriptor;
   wait for each of the identified overlapping locked ranges of elements to be released; and
   execute, subsequent to waiting for each of the identified overlapping locked ranges of elements to be released, an atomic operation to insert a descriptor for the first range into the linked list of descriptors of currently locked ranges to lock the plurality of elements of the first range of elements of the shared resource, wherein the atomic operation comprises determining that no ranges overlapping the first range have been added to the linked list of descriptors;
   wherein the lock acquisition operation executes on a particular thread of the plurality of threads, and wherein the performing of the lock acquisition operation does not exclude access to the linked list of descriptors by other threads of the plurality of threads.

16. The system of claim 15, wherein the atomic operation comprises an atomic compare and swap operation on the link to a next descriptor of a descriptor of a currently locked range.

17. The system of claim 15, wherein the lock acquisition operation on the first range of elements acquires a non-exclusive lock, wherein the descriptor for the first range comprises an indicator of a non-exclusive lock, and wherein the identified locked ranges of elements overlapping the first range exclude currently locked ranges comprising respective descriptors indicating non-exclusive locks.

18. The system of claim 15, the lock acquisition operation on the first range of elements further configured to:
   scan the linked list of descriptors of currently locked ranges comprising respective descriptors indicating exclusive locks to identify locked ranges of elements overlapping the first range; and
   wait for each of the identified overlapping exclusively locked ranges of elements to be released.

19. The system of claim 15, the memory further comprising program instructions executable by the one or more processors to perform a release operation on a particular currently locked range of elements of a shared resource, the release operation configured to:
   perform, on a descriptor of the particular currently locked range, an atomic fetch and add operation on the link to the next descriptor to update a particular bit of the next descriptor to indicate the particular currently locked range has been released.

20. The system of claim 15, the memory further comprising program instructions executable by the one or more processors to perform a lock acquisition operation on a second range of elements of a shared resource, the lock acquisition operation on the second range of elements configured to:
   determine that a head pointer for the linked list of descriptors indicates that the linked list is empty; and
   insert a descriptor for the second range into the empty linked list of descriptors to lock the second range of elements of the shared resource via a fast insertion, wherein to insert the descriptor the lock acquisition operation on the second range of elements configured to:
   write the head pointer to the address of the descriptor for the second range; and
   set an indicator of fast insertion for the linked list of descriptors.

* * * * *